2,992,188
WATER DISPERSIBLE GUM PRODUCT AND METHOD

Aaron Miller, La Jolla, and Foss E. Corley, San Diego, Calif., assignors to Kelco Company, San Diego, Calif., a corporation of Delaware
No Drawing. Filed Feb. 19, 1957, Ser. No. 641,044
7 Claims. (Cl. 252—363.5)

This invention relates to a new method of dispersing and dissolving water soluble gums and improved water soluble gum products. More particularly, this invention relates to a method of dispersing and dissolving alginates in aqueous solution and a new alginate composition having improved water solubility.

The so-called water soluble gums include such materials as Irish moss, agar, gum tragacanth, guar gum, locust bean gum, karaya gum, carboxymethyl cellulose, pectin, methyl cellulose, and other water soluble cellulose gums, and algin are used in many applications as colloidal additives or stabilizers. In general, such materials are usually dissolved in aqueous solutions and the solution added to a given mix or added dry to aqueous solutions; thus, for example, an ice cream mix. A problem usually arises in most applications of getting the particular gum employed to disperse and go into solution in an aqueous medium. In some applications, so-called high speed mixers are used and other means of obtaining high speed agitation and/or shear. As aforementioned, in accordance with this invention, I have provided a new method for dispersing and dissolving such gums, as well as a new improved gum product, and particularly a new and useful algin gum product.

It is an object of this invention, therefore, to provide a gum of improved dispersion characteristics in water.

It is another object of this invention to provide a method of improving the solubility of gums in aqueous solutions.

It is a further object of this invention to provide a new and useful gum composition.

It is still another object of this invention to provide a new and useful water soluble algin composition.

In accordance with our invention, we have found that water soluble gums, and particularly a so-called water soluble algin, in combination with molasses, have unexpectedly improved dispersion and solubility in water.

The materials that we refer to as water soluble algin are well known commercial products. Algin may be prepared by well known methods such as disclosed in the following United States patents: 1,814,981, Thornley and Walsh, July 14, 1931; 2,036,922, Clark and Green, April 7, 1936; 2,039,934, Green, April 7, 1936; and 2,128,551, Le Gloahec, August 30, 1938.

The molasses which is preferably a straight cane refiners' syrup that we combine with a water soluble gum to improve its solubility in water is likewise a commercial product obtainable in the form of a dark brown liquid containing approximately 75% solids. Another particularly suitable molasses for our purpose is a light Louisiana molasses.

In preparing our composition, we coat the water soluble gum particles with a molasses and dry the resulting product to the extent that it is free flowing. It is thereafter milled and sized. This product, either alone or in combination with other additives, is then ready for use.

In general, we prefer to use from 10% to 70% of a molasses such as straight cane refiners' syrup on a dry weight or solid basis per dry weight of the water soluble gum employed. In the event a lesser amount of molasses is used, the resulting composition does not have the improved dispersion desired in accordance with this invention. In the event larger percentages of molasses are employed, the product will still have the desired excellent dispersion. However, it will become sticky and unsatisfactory from an overall commercial product standpoint. In the event the user of a composition in accordance with our invention desires to incorporate other materials for some particular purpose, it is usually necessary to use more of the aforementioned molasses than the quantity set forth. This is particularly true if the other material is added to the water soluble gum before the molasses is incorporated with the composition. The reason for the additional quantity of molasses is that the other materials present will also tend to be coated by the molasses and thus a larger quantity is required in order to have the effective quantities needed for the water soluble gum.

In order to evaluate the effectiveness of our invention, we used a carefully standardized dispersion test hereinafter described. A laboratory Lightnin mixer was set up so that it would run at a speed of 400 r.p.m. The bottom of the propeller shaft thereon was centered in a 400 ml. beaker 2.3 cm. from the inside bottom of the beaker. A glass tube having an inside diameter of 2½ cm. was mounted so that it was directed at the center of the beaker. The bottom of this tube was positioned directly above the side of the beaker and 12½ cm. from the inside bottom of the beaker. The angle between the tube and the propeller shaft was fixed at 30°. In order to make a dispersion test, 250 ccs. of water at 20° C. was placed in the 400 mm. beaker. A 5 gm. sample of the material to be tested was placed in a glass tube and held there with a sliding stop at the bottom of the tube. The material was released by a sudden removal of the sliding stop with the propeller running at 400 r.p.m. as aforesaid. At the end of 1 minute of stirring, the contents of the beaker were poured on to a screen of 16 mesh size and the number of lumps were counted. A rating of from 0 to 10 was applied to the sample according to the number and size of the lumps present. Thus, for example, a rating of 0 indicated excellent dispersion with no lumps present. A rating of 1 indicated that 1 small lump, smaller than 7 mm. in diameter, was present on the screen at the time of the test. In instances where more or larger lumps were present, the rating was progressively increased.

The following table gives the results of testing several commercial gums with a molasses, in this case a straight cane refiners' syrup, in accordance with our invention.

| Product | Percent Molasses | Dispersion Before Treatment | Rating After Treatment |
| --- | --- | --- | --- |
| A high viscosity fibrous sodium alginate | 30 | #10 | #5 |
| A mixed calcium and ammonium alginate | 20 | #8 | #½ |
| A medium viscosity sodium alginate | 20 | #7 | 0 |
| A low viscosity ammonium alginate | 20 | #9 | 0 |
| A low viscosity fine mesh propylene glycol alginate | 20 | #9 | #1 |
| A medium viscosity sodium alginate | 10 | #3 | 0 |
| A medium viscosity potassium alginate | 30 | #10 | #5 |
| A medium viscosity carboxymethylcellulose | 40 | #10 | #½ |
| A high viscosity carboxymethylcellulose | 40 | #10 | #2 |

We claim:
1. A new and useful water dispersible gum composition comprising a water soluble gum selected from the group consisting of algin, Irish moss, gum tragacanth, guar gum, pectin, methyl cellulose, locust bean gum, ka- raya gum, and carboxymethylcellulose; and from 10% to 70% by weight on a dry basis of said gum of a molasses, said gum being coated with said molasses.

2. A new and useful water dispersible gum composition comprising a water soluble gum selected from the group consisting of algin, Irish moss, gum tragacanth, guar gum, pectin, methyl cellulose, locust bean gum, karaya gum, and carboxymethylcellulose; and a coating on said gum of from 10% to 70% by weight on a dry basis of straight cane refiners' syrup.

3. A new and useful composition particularly suitable as a stabilizing additive for aqueous solutions comprising a water soluble algin coated with a molasses in an amount equal to from 10% to 70% by weight on a dry basis of the weight of said algin.

4. A new and useful water soluble gum composition comprising a water soluble gum coated with a molasses in an amount equal to from 10 to 70 percent by weight on a dry basis of the weight of the gum to improve the dispersibility and solubility of said gum.

5. The method of improving the dispersibility and solubility of a water soluble gum, comprising coating the particles thereof with from 10% to 70% by weight of a molasses on a dry basis and drying the resulting product to the extent that it is free flowing.

6. The method of improving the dispersibility and solubility of a water soluble algin in an aqueous solution comprising coating the particles of said algin with from 10% to 70% by weight thereof with a molasses and thereafter drying the resulting product to the extent that it is free flowing.

7. The method of improving the dispersibility and solubility of a water soluble algin in an aqueous solution comprising coating particles thereof with from 10% to 70% by weight thereof with straight cane refiners' syrup and thereafter drying the resulting product to the extent that it is free flowing.

References Cited in the file of this patent

UNITED STATES PATENTS

| | | |
|---|---|---|
| 1,182,517 | Whitaker | May 9, 1916 |
| 2,000,807 | Wig | May 7, 1935 |
| 2,376,656 | Buchanan | May 22, 1945 |
| 2,445,226 | Landers | July 13, 1948 |